(12) United States Patent
Nonaka et al.

(10) Patent No.: US 8,043,682 B2
(45) Date of Patent: Oct. 25, 2011

(54) RELEASE LINER AND PRESSURE-SENSITIVE ADHESIVE SHEET USING THE SAME

(75) Inventors: Akiko Nonaka, Ibaraki (JP); Shinji Inokuchi, Ibaraki (JP); Hiroshi Wada, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 881 days.

(21) Appl. No.: 12/073,019

(22) Filed: Feb. 28, 2008

(65) Prior Publication Data

US 2008/0213527 A1   Sep. 4, 2008

(30) Foreign Application Priority Data

Mar. 2, 2007   (JP) ................. 2007-053034

(51) Int. Cl.
 B32B 9/00       (2006.01)
 B32B 33/00      (2006.01)
 B32B 17/10      (2006.01)
(52) U.S. Cl. ............. 428/40.1; 428/40.2; 428/41.5; 428/409
(58) Field of Classification Search ............ 428/40.1–43
 See application file for complete search history.

(56) References Cited

U.S. PATENT DOCUMENTS

| | | | |
|---|---|---|---|
| 4,946,532 A * | 8/1990 | Freeman | ............... 156/243 |
| 6,395,360 B1 | 5/2002 | Takahira et al. | |
| 2003/0077442 A1 | 4/2003 | Inokuchi et al. | |
| 2003/0215628 A1 | 11/2003 | Ma et al. | |
| 2005/0266195 A1 | 12/2005 | Nonaka et al. | |

FOREIGN PATENT DOCUMENTS

| | | |
|---|---|---|
| EP | 1123801 | 8/2001 |
| EP | 1508439 | 2/2005 |
| JP | 2000-239624 | 9/2000 |
| JP | 2003-127299 | 5/2003 |
| JP | 2005-350650 | 12/2005 |

OTHER PUBLICATIONS

"Olefin-Elastomere," ROMPP Online, Version 3.1, No. RD-15-00486, Dec. 2006, 1 page.
European Search Report dated Jul. 1, 2008, issued on a corresponding European patent application No. 08003508.2.

* cited by examiner

*Primary Examiner* — Patricia Nordmeyer
(74) *Attorney, Agent, or Firm* — Edwards Angell Palmer & Dodge LLP; James E. Armstrong, IV; Junko Harada

(57) ABSTRACT

A pressure-sensitive adhesive sheet with a release liner has a bubbles containing pressure-sensitive adhesive layer and a release liner in contact with at least one surface of the bubbles containing pressure-sensitive adhesive layer. The release liner comprises at least three layers including an intermediate layer and surface layers, and the surface layers are positioned on both surfaces of the intermediate layer. The intermediate layer comprises at least one polyolefin resin. Each of the surface layers comprises a low-density polyethylene and an olefinic elastomer and independently has a thickness of 15 μm or less. The ratio of the thickness of the intermediate layer to the total thickness of the surface layers (the intermediate layer/the surface layers) is in the range of 4 to 19.

20 Claims, No Drawings

RELEASE LINER AND PRESSURE-SENSITIVE ADHESIVE SHEET USING THE SAME

BACKGROUND OF THE INVENTION

1. Field of the Invention

The present invention relates to a pressure-sensitive adhesive sheet with a release liner. More specifically, it relates to a pressure-sensitive adhesive sheet with a release liner which excels in die-cutting workability and releasability. In addition, it relates to a release liner for use with the pressure-sensitive adhesive sheet.

2. Description of the Related Art

Pressure-sensitive adhesive sheets (tacky adhesive sheets) generally include a pressure-sensitive adhesive layer (tacky adhesive layer) and a sheet material in contact with the pressure-sensitive adhesive layer and having releasability (hereinafter referred to as "release liner"), so that the release liner can be peeled off from the pressure-sensitive adhesive layer.

Such pressure-sensitive adhesive sheets with a release liner are used typically for the affixation of automotive emblems. In this use, a pressure-sensitive adhesive sheet (pressure-sensitive adhesive double-sided sheet) is die-cut into a shape corresponding to an emblem, one of two adhesive surfaces is affixed to the back surface of the emblem. The resulting emblem is generally stored while bearing a release liner on the other adhesive surface of the sheet, and the release liner is removed before use. Pressure-sensitive adhesive sheets with release liners for use in this use should have storage stability to avoid "lifting and unintended separation" of the release liner during storage, should satisfactorily undergo die-cutting, and should be sufficiently releasable upon use.

As release liners for use with pressure-sensitive adhesive sheets, there have been used release liners formed by applying a film of silicone release agent or the like through coating and curing the coated film. To save such coating process, release liners composed of polyethylene or polypropylene have been recently employed. Examples of these release liners can be found in Japanese Unexamined Patent Application Publication (JP-A) No. 2000-239624 corresponding to U.S. Pat. No. 6,395,360B; JP-A No. 2003-127299 corresponding to US20030077442A; and JP-A No. 2005-350650 corresponding to US20050266195A.

However, with increasing design features, automotive emblems have more and more complicated shapes, and pressure-sensitive adhesive sheets using these known release liners suffer from disadvantages in workability, such as poor die-cutting workability. Additionally, they also suffer from problems in handleability. For example, when the release liner is removed, insufficient peel may occur at the edge of the emblem, or deformation of a part of the emblem may occur under a high peel stress.

Not only in the above-mentioned use but also in other uses, there is a need of providing release liners and pressure-sensitive adhesive sheets that are satisfactorily worked through die-cutting and excel in releasability.

SUMMARY OF THE INVENTION

Under these circumstances, an object of the present invention is to provide a pressure-sensitive adhesive sheet with a release liner, which is resistant to lifting and unintended separation of the release liner during storage, can therefore be stored sufficiently stably, shows good workability in die-cutting, and exhibits excellent releasability when it is used.

Another object of the present invention is to provide a release liner for use with the pressure-sensitive adhesive sheet.

After intensive investigations, the present inventors have found that a pressure-sensitive adhesive sheet with a release liner which satisfies all the requirements in storage stability, die-cutting workability, and releasability is obtained by arranging a release liner adjacent to a bubbles containing pressure-sensitive adhesive layer of a pressure-sensitive adhesive sheet, which release liner has a specific resin composition, a specific layer structure, and a specific ratio in thickness of layers. The present invention has been made based on these findings.

Specifically, according to the present invention, there is provided a pressure-sensitive adhesive sheet with a release liner, having a bubbles containing pressure-sensitive adhesive layer and a release liner in contact with at least one surface of the bubbles containing pressure-sensitive adhesive layer. The release liner satisfies the following conditions (1) to (4): (1) the release liner comprises at least three layers including an intermediate layer and surface layers positioned on both surfaces of the intermediate layer; (2) the intermediate layer comprises at least one polyolefin resin; (3) each of the surface layers comprises a low-density polyethylene and an olefinic elastomer; and (4) each of the surface layers independently has a thickness of 15 μm or less, and the ratio of the thickness of the intermediate layer to the total thickness of the surface layers (the intermediate layer/the surface layers) is in the range of 4 to 19.

The pressure-sensitive adhesive sheet with a release liner uses a polyolefin resin being somewhat flexible as an intermediate layer of the release liner and is thereby substantially free from lifting and unintended separation of the release liner even when the adhesive sheet with the release liner is affixed to an adherend, and the adherend deforms during storage. Thus, the pressure-sensitive adhesive sheet can be satisfactorily stably stored. The adhesive sheet uses a resin mixture of a low-density polyethylene and an olefinic elastomer in surface layers of the release liner, thereby exhibits excellent releasability, and can be worked satisfactorily. In addition, the adhesive sheet is unlikely to deform during die-cutting and is worked satisfactorily through die-cutting even though it uses flexible surface layers, because the thickness of the surface layers of the release liner and the ratio in thickness of the intermediate layer to the surface layers are set within specific ranges, respectively. The adhesive sheet is therefore industrially useful typically as a pressure-sensitive adhesive double-sided sheet for the affixation of automotive emblems.

Preferably, the olefinic elastomer is an ethylene-alpha-olefin copolymer having a density of less than 900 (kg/m$^3$).

Preferably, the polyolefin resin is at least one of a polypropylene and a high-density polyethylene.

More preferably, the bubbles containing pressure-sensitive adhesive layer mainly contains an acrylic pressure-sensitive adhesive.

More preferably, the release liner has a thickness of 50 to 200 μm.

Particularly, the surface layers comprise a first surface layer being to be in contact with the bubbles containing pressure-sensitive adhesive layer, and the second surface layer being positioned on the opposite side of the first surface layer side. The first surface layer of the release liner has an arithmetical mean surface roughness (Ra) of 0.4 to 5.0 μm, and the second surface layer of the release liner has an arithmetical mean surface roughness (Ra) of 0.4 to 5.0 μm. The arithmetical mean surface roughness (Ra) of the second surface layer is larger than the arithmetical mean surface roughness (Ra) of the first surface layer.

In the present invention, there is also provided a release liner comprising at least three layers including an intermediate layer and surface layers positioned on both surfaces of the intermediate layer. The intermediate layer comprises at least one polyolefin resin. Each of the surface layers comprises a low-density polyethylene and an ethylene-alpha-olefin copolymer having a density of less than 900 (kg/m$^3$), and independently has a thickness of 15 μm or less. The ratio of the thickness of the intermediate layer to the total thickness of the surface layers (the intermediate layer/the surface layers) is in the range of 4 to 19.

DESCRIPTION OF THE PREFERRED EMBODIMENTS

The present invention will be illustrated in detail below. As used herein "release liner" and "pressure-sensitive adhesive sheet" may also be in tape form and also include "release tape" and "pressure-sensitive adhesive tape", respectively. All numbers are herein assumed to be modified by the term "about."

A pressure-sensitive adhesive sheet with a release liner according to the present invention includes at least a pressure-sensitive adhesive sheet having a bubbles containing pressure-sensitive adhesive layer (pressure-sensitive adhesive portion); and at least one release liner, in which the at least one release liner is in contact with a surface of the bubbles containing pressure-sensitive adhesive layer without the interposition of another layer. In other words, the pressure-sensitive adhesive sheet has a structure of "(bubbles containing pressure-sensitive adhesive layer)/(release liner)" or a structure of "(release liner)/(bubbles containing pressure-sensitive adhesive layer)/(release liner)". The term "pressure-sensitive adhesive sheet" as simply used herein mainly refers to a pressure-sensitive adhesive portion not including a release liner, unless otherwise specified.

[Release Liner]

A release liner according to the present invention has a layer structure composed of at least three layers including first and second surface layers, and an intermediate layer (center layer, core layer) arranged between the first and second surface layers. The first and second surface layers may independently be in contact with the intermediate layer directly or with the interposition of another layer such as a bonding (adhesion) layer.

Surface Layers

Each of the first and second surface layers of the release liner contains at least a low-density polyethylene and an olefinic elastomer. The total content of a low-density polyethylene and an olefinic elastomer is preferably 60 percent by weight or more, and more preferably 90 percent by weight or more, based on the total weight of the surface layers. This polymer composition improves the releasability. In this connection, the first surface layer is positioned in the side of the intermediate layer, to be contact with the bubbles containing pressure-sensitive adhesive layer, and the second surface layer is positioned in the opposite side with the interposition of the intermediate layer.

As used herein "low-density polyethylene (LDPE)" refers to a polyethylene that has a density as measured according to Japanese Industrial Standards (JIS) K 6922-2 of 900 (kg/m$^3$) or more and less than 930 (kg/m$^3$). As used herein "low-density polyethylene" includes so-called "low-density polyethylene", "very low-density polyethylene", and "linear low-density polyethylene (LLDPE)". Such "low-density polyethylene" and "very low-density polyethylene" are prepared by polymerization of ethylene monomer through a high-pressure process and have long-chain branches. Such "linear low-density polyethylene (LLDPE)" is prepared by polymerization of ethylene and an alpha olefin monomer having three to eight carbon atoms through a low-pressure process. The linear low-density polyethylene may have a short-chain branch preferably having one to six carbon atoms. Of these low-density polyethylenes for use in the surface layers of the release liner of the present invention, a linear low-density polyethylene (LLDPE) is preferred, because its properties such as releasability can be easily controlled through the copolymerization of an alpha olefin (by changing the compound ratio). As the comonomer component (alpha olefin) for use in combination with ethylene in the linear low-density polyethylene, 1-hexene and/or 1-octene is preferred.

As used herein "olefinic elastomer" refers to a copolymer of alpha olefins or a copolymer containing alpha olefins and another monomer component, and is not particularly limited, as long as it shows elastomeric properties. Examples of the olefinic elastomers include ethylene-alpha-olefins copolymers, propylene-alpha-olefins copolymers, ethylene-propylene-dienes copolymers, ethylene-vinyl acetate copolymers, polybutenes, polyisobutylenes, and chlorinated polyethylenes.

Among the olefinic elastomers, ethylene-alpha-olefin copolymer elastomers are particularly preferred, because they give satisfactory releasability and are well compatible (miscible) with another component. Ethylene-alpha-olefin copolymers that have a density as determined according to JIS K 6922-2 of less than 900 (kg/m$^3$), such as those having a density of 860 (kg/m$^3$) or more and less than 900 (kg/m$^3$), are included in the olefinic elastomers for use herein. The alpha olefin component of an ethylene-alpha-olefin copolymer elastomer is not particularly limited but is preferably an alpha olefin having about three to about ten carbon atoms, such as propylene or butene. The alpha olefin component can be, for example, at least one alpha olefin (comonomer) selected from the group consisting of propylene, butene-1, hexene-1, 4-methylpentene-1, and octene-1.

The low-density polyethylene and olefinic elastomer are also commercially available. Typically, low-density polyethylenes are supplied by Prime Polymer Co., Ltd. under the trade names of "MORETEC 0628D and 0218CN" (LLDPE). Olefinic elastomers are supplied, for example, by Mitsui Chemicals, Inc. under the trade names of "TAFMER P" series (ethylene-propylene copolymers). Among them, "TAFMER P: P0180 and P0280" are useful for their high film-formability.

Each of the low-density polyethylenes and each of the olefinic elastomers can be used alone or in combination, respectively.

The content of the olefinic elastomers in the surface layers of the release liner of the present invention is preferably 10 to 200 parts by weight, more preferably 25 to 100 parts by weight, and further preferably 50 to 75 parts by weight, to 100 parts by weight of the low-density polyethylenes. Addition of one or more olefinic elastomers improves releasability. On the other hand, the surface layers become more flexible with an increasing content of olefinic elastomer(s), and this may lower workability and/or cause blocking in some cases. If the content of olefinic elastomer(s) is less than 10 parts by weight, sufficient releasability may not be obtained. In contrast, if it exceeds 200 parts by weight, the workability and anti-blocking properties may be insufficient.

The surface layers of the release liner of the present invention may further contain additives within ranges not adversely affecting the advantages, in addition to the low-density polyethylene and olefinic elastomers. Examples of additives include colorants (pigments and dyestuffs), fillers, lubricants, age resistors, antioxidants, ultraviolet-absorbers, flame retardants, and stabilizers.

The first and second surface layers of the release liner of the present invention may contain different polymers and have different compositions, as long as the above conditions are satisfied, but they preferably contain the same polymer(s) with the same composition, for avoiding the curling of the release liner.

Intermediate Layer

The intermediate layer of the release liner of the invention contains at least one polyolefin resin. The content of the polyolefin resin is preferably 50 percent by weight or more, and more preferably 80 percent by weight or more, based on the total weight of the intermediate layer. Such polyolefin resins are relatively more flexible than polyester resins such as poly(ethylene terephthalate). Therefore, by using the polyolefin resin in an intermediate layer of a release liner, the release liner can more satisfactorily follow the deformation of an adherend, and this suppresses lifting and unintended separation of the release liner during storage. In contrast, when an adhesive sheet with a release liner using a polyester resin in an intermediate layer is affixed to an automotive resinous emblem and stored, the release liner may fail to follow even slight deformation of the emblem and the adhesive sheet may suffer from lifting and unintended separation of the release liner, and this lowers productivity.

The polyolefin resin is preferably Polypropylenes (PP) or high-density polyethylenes (HDPE), for ensuring strength and improving workability of the release liner. Specifically, the intermediate layer of the release liner of the present invention preferably contains a polypropylene (PP) and/or a high-density polyethylene (HDPE) in a total content of 50 percent by weight or more, and more preferably 80 percent by weight or more, based on the total weight of the intermediate layer. Particularly, the intermediate layer is preferably composed of a transparent or semi-transparent resin, such as a random polypropylene, when employed in a use where an adherend in opposite side should be visible during working. As used herein "high-density polyethylene" refers to a polyethylene having a density as determined according to JIS K 6922-2 of 930 (kg/m$^3$) or more, and preferably from 942 to 960 (kg/m$^3$).

Such polyolefin resins are also commercially available. Typically, polypropylenes (PP) are available as "Sumitomo Nobrene WF836DG3 and FS3611" supplied by Sumitomo Chemical Co., Ltd., and "NOVATEC PP EG6D" supplied by Japan Polypropylene Corporation; and high-density polyethylenes (HDPE) are available as "HI-ZEX 3300F" supplied by Prime Polymer Co., Ltd., and "Nipolon Hard 4050" supplied by TOSOH CORPORATION.

The intermediate layer of the release liner of the present invention may further contain one or more colorants such as pigments. Coloring of the intermediate layer enables, for example, to distinguish article number easily and increases handleability of the resulting article. The pigments can be known or common organic and inorganic pigments as selected according typically to a desired color. Examples of such pigments include carbon black, iron oxide, titanium oxide, titanium yellow, cobalt blue, cadmium red, azo lake pigments (red, yellow), phthalocyanine pigments, and quinacridone pigments.

The intermediate layer of the release liner of the present invention may further contain one or more antistatic agents, for improving the workability and preventing damage of the release liner (release layer). Examples of usable antistatic agents include known or common nonionic, anionic, and cationic antistatic agents.

The intermediate layer of the release liner of the present invention may further contain additives within ranges not adversely affecting the advantages, in addition to the resin components, colorants, and antistatic agents. Examples of such additives include fillers, lubricants, age resistors, antioxidants, ultraviolet-absorbers, flame retardants, and stabilizers.

Release Liner

The first and second surface layers of the release liner of the present invention each independently have a thickness of 15 μm or less, and preferably 10 μm or less. These surface layers contain an olefinic elastomer and then, are flexible or soft. With increasing thicknesses of the surface layers, therefore, the release liner as a whole is likely to have decreased strength and reduced rigidity, and is likely to be cut insufficiently because the surface layers elongate. Specifically, a release liner containing surface layers each having a thickness exceeding 15 μm may have insufficient die-cutting workability and may be likely to suffer from working failure such as "whisker" and "residual stock removal" during working such as die-cutting. While its lower limit is not particularly limited, in order to prepare the surface layers having uniform thickness, the thickness of each of the surface layers is preferably 5 μm or more when the surface layers are formed through coextrusion, and it is preferably about 0.1 to 5 μm when the surface layers are formed by coating.

The ratio of the thickness of one layer having a larger thickness to the thickness of the other layer having a smaller thickness is preferably 3 or less, and more preferably 2 or less. A release liner having the ratio of larger than 3 may suffer from curling.

The thickness of the intermediate layer of the release liner of the present invention is preferably 40 to 190 μm, and more preferably 90 to 170 μm. The intermediate layer imparts strength to the release liner. A release liner including an intermediate layer having a thickness of less than 40 μm may have insufficient strength and rigidity and may thereby have insufficient die-cutting workability and handleability. A release liner including an intermediate layer having a thickness of more than 200 μm may have excessively high rigidity, may be unlikely to follow, for example, a curved emblem sufficiently, and may suffer from lifting or unintended separation.

The total thickness of the release liner of the present invention is preferably 50 to 200 μm, and more preferably 100 to 180 μm.

In the release liner, the ratio of the thickness of the intermediate layer to the total thickness of the first and second surface layers (intermediate layer/surface layers) is in the range of 4 to 19, and is preferably in the range of 6 to 10. If the ratio is smaller than the range, namely, if the intermediate layer is relatively thin, the release liner may have insufficient strength and rigidity and may show insufficient die-cutting workability and handleability. If the ratio is more than the range, namely, if the surface layers are relatively thin, the surface layers having uniform thickness may not be provided typically by coextrusion.

The release liner of the present invention has a Young's modulus of preferably 150 to 700 MPa, and more preferably 200 to 500 MPa, for providing good die-cutting workability.

The release liner of the present invention can be produced by a known or common sheet forming process, including a melting filming process such as a T-die process or an inflation process; or a solution filming process. The laminating process for the release liner of the present invention is not particularly limited, and layer components may be laminated by a known or common process such as a coextrusion process, a dry laminating process, or wet laminating process. Of these processes, the coextrusion process is preferred for satisfactory productivity.

The first and second surfaces of the release liner are preferably subjected to a matt finish. The surface with matt finish improves the releasability at terminals of the release liner from an adhesive surface, and increases anti-blocking properties. The matt finish may be carried out, for example, by a process in which the surfaces of the release liner are ground with a buffing wheel or sand paper; sand blasting in which particles of glass beads, Carborundum, or metal particles are vigorously blown with compressed air to the surfaces of the release liner so as to make fine scars in the surfaces; embossing with an embossed roll; or a chemical matt finish by treatment with a chemical agent.

The arithmetical mean surface roughness (Ra) of the first surface layer (to be in contact with a bubbles containing pressure-sensitive adhesive layer) of the release liner is preferably about 0.4 to 5.0 µm, while it may vary depending on the thickness of the after-mentioned bubbles containing pressure-sensitive adhesive layer. Particularly, when the bubbles containing pressure-sensitive adhesive layer has a thickness of 200 to 1200 µm, the arithmetical mean surface roughness (Ra) of the first surface layer is preferably 0.4 to 2.0 µm, and more preferably 0.45 to 1.2 µm.

The arithmetical mean surface roughness (Ra) of the first surface layer of the release liner to be in contact with the bubbles containing pressure-sensitive adhesive layer affects the releasability at the end of the release liner. As used herein "releasability at the end" refers to releasability at the end of the release liner when the release liner is arranged on one adhesive surface of a pressure-sensitive adhesive double-sided sheet, the other adhesive surface adheres to an adherend such as a resin molded article including an automotive emblem, and the release liner is peeled off from the pressure-sensitive adhesive sheet. As used herein "the end of the release liner" refers to a starting point or origin of the peeling of the release liner. Such end also includes a region where the contact width between an adherend and the release liner suddenly widens and a region where an adherend is curved and the direction of peeling suddenly changes. A release liner with poor releasability at the end may be resistant to peeling off, for example, at so-called "starting point", and the workability is remarkably decreased while the release liner is peeled off from an adherend. Additionally, when such a release liner is peeled off from an adherend having a complicated shape such as a part (component) with a suddenly narrowed region, the adherend may break, because the peel stress suddenly increases and a load is applied to the adherend during peeling.

The releasability at the end is much affected by how a pressure-sensitive adhesive layer and the release liner are in contact with each other at a peeling interface between them. At such a peeling interface, the peeling just proceeds. When the surface roughness is large, namely, when the release liner has a rough surface, the release liner shows improved releasability at the end, because stress is likely to focus in a narrow region at the peeling interface.

On the other hand, if a release liner has an excessively rough surface, because a bubbles containing pressure-sensitive adhesive layer is flexible, the pressure-sensitive adhesive layer may penetrate into uneven surface of the release liner during in contact between the two layers, typically during storage. This may increase the contact area and change the peeling strength with time to make the releasability unstable.

Such a bubbles containing pressure-sensitive adhesive layer penetrates more and more with an increasing thickness thereof.

The arithmetical mean surface roughness (Ra) of the second surface layer (opposite to the bubbles containing pressure-sensitive adhesive layer; back surface or exposed surface) of the release liner is preferably about 0.4 to 5.0 µm, while such preferred surface roughness may vary depending on the thickness of the bubbles containing pressure-sensitive adhesive layer. Particularly, when the bubbles containing pressure-sensitive adhesive layer has a thickness of 200 to 1200 µm, the arithmetical mean surface roughness (Ra) is preferably 1.0 to 5.0 µm, and more preferably 1.3 to 2.0 µm. The back surface (second surface layer) preferably has an arithmetical mean surface roughness (Ra) larger than the arithmetical mean surface roughness (Ra) of the first surface layer to be in contact with the bubbles containing pressure-sensitive adhesive layer.

If the surface roughness of the second surface layer (back surface) is smaller than the above-specified range, the release liner may be unwound insufficiently. If it is larger than the range, the release liner may show unstable peeling strength with time, as in the surface roughness of the first surface layer to be in contact with the bubbles containing pressure-sensitive adhesive layer.

[Pressure-Sensitive Adhesive Sheet (Pressure-Sensitive Adhesive Portion)]

A pressure-sensitive adhesive sheet in a pressure-sensitive adhesive sheet with a release liner according to the present invention has a layer structure including at least a bubbles containing pressure-sensitive adhesive layer. According to its use, the pressure-sensitive adhesive sheet may be a pressure-sensitive adhesive sheet having only one surface constituting a pressure-sensitive adhesive surface, or a pressure-sensitive adhesive double-sided sheet having both surfaces constituting pressure-sensitive adhesive surfaces. The pressure-sensitive adhesive sheet may be a pressure-sensitive adhesive sheet with a substrate (carrier material or support), in which a pressure-sensitive adhesive layer is arranged on one or both sides of the substrate; or a transfer pressure-sensitive adhesive sheet which includes a pressure-sensitive adhesive layer (bubbles containing pressure-sensitive adhesive layer) alone without a substrate. In use typically for the affixation of automotive emblems, the pressure-sensitive adhesive sheet is preferably a transfer pressure-sensitive adhesive double-sided sheet which includes a bubbles containing pressure-sensitive adhesive layer alone without a substrate, because such transfer pressure-sensitive adhesive double-sided sheet more satisfactorily follows the shape of an adherend and makes adhesion (affixation) more reliably.

Bubbles Containing Pressure-Sensitive Adhesive Layer

A pressure-sensitive adhesive layer containing gas bubbles of the pressure-sensitive adhesive sheet includes at least a pressure-sensitive adhesive (tacky adhesive) and a gas bubbles containing structure. The "gas bubbles containing structure" as used herein refers to a structure containing a gaseous component and can be any of, for example, a "ball of gas" containing structure that includes no shell but a gaseous component alone, and a "hollow microsphere" structure that includes a shell and a gaseous component encapsulated therein, such as glass microbubbles. Hereinafter, a precursor composition, such as a composition before curing, for the bubbles containing pressure-sensitive adhesive layer is simply referred to as "pressure-sensitive adhesive composition".

Examples of the pressure-sensitive adhesive constituting the bubbles containing pressure-sensitive adhesive layer include rubber pressure-sensitive adhesives; acrylic pressure-sensitive adhesives, vinyl alkyl ether pressure-sensitive adhesives, silicone pressure-sensitive adhesives, polyester pressure-sensitive adhesives, polyamide pressure-sensitive adhesives, urethane pressure-sensitive adhesives, fluorine-containing pressure-sensitive adhesives, styrene-diene block copolymer pressure-sensitive adhesives, and epoxy pressure-sensitive adhesives. Each of these can be used alone or in combination. Photocurable pressure-sensitive adhesives such as ultraviolet-curable pressure-sensitive adhesives can also be used herein.

In the present invention, acrylic pressure-sensitive adhesives are typically preferred as the pressure-sensitive adhesive for use herein. Such acrylic pressure-sensitive adhesives generally contain an acrylic polymer as a base polymer. Such acrylic polymer contains, as a main monomer component, a (meth)acrylic ester such as a (meth)acrylic alkyl ester.

Examples of the (meth)acrylic alkyl ester include (meth)acrylic alkyl esters whose alkyl moiety has one to twenty carbon atoms, such as methyl (meth)acrylates, ethyl(meth)acrylates, propyl(meth)acrylates, isopropyl(meth)acrylates, butyl(meth)acrylates, isobutyl(meth)acrylates, s-butyl(meth)acrylates, t-butyl(meth)acrylates, pentyl(meth)acrylates, isopentyl(meth)acrylates, hexyl(meth)acrylates, heptyl(meth)acrylates, octyl(meth)acrylates, 2-ethylhexyl(meth)acrylates, isooctyl(meth)acrylates, nonyl(meth)acrylates, isononyl(meth)acrylates, decyl(meth)acrylates, isodecyl(meth)acrylates, undecyl(meth)acrylates, dodecyl(meth)acrylates, and tetradecyl(meth)acrylates, of which (meth)acrylic alkyl esters whose alkyl moiety has two to fourteen carbon atoms are preferred, and (meth)acrylic alkyl esters whose alkyl moiety has two to ten carbon atoms are more preferred. Examples of other (meth)acrylic esters than (meth)acrylic alkyl esters include (meth)acrylic esters having an alicyclic hydrocarbon group, such as cyclopentyl(meth)acrylates, cyclohexyl(meth)acrylates, and isobornyl(meth)acrylates; and (meth)acrylic esters having an aromatic hydrocarbon group, such as phenyl(meth)acrylates.

Each of these (meth)acrylic esters can be used alone or in combination. The total amount of (meth)acrylic esters, particularly (meth)acrylic alkyl esters, in the acrylic polymer is, for example, 60 percent by weight or more, and preferably 80 percent by weight or more, based on the total amount of monomer components for constituting the acrylic pressure-sensitive adhesive.

The acrylic polymer may further contain, as a monomer component, any of copolymerizable monomers such as polar-group-containing monomers and multifunctional monomers. Use of such a copolymerizable monomer as a monomer component may increase adhesive strength and cohesive strength of the pressure-sensitive adhesive. Each of these copolymerizable monomers can be used alone or in combination.

The polar-group-containing monomers include, for example, carboxyl-containing monomers such as (meth)acrylic acids, itaconic acid, maleic acid, fumaric acid, crotonic acid, and isocrotonic acid, and anhydrides of these acids, such as maleic anhydride; hydroxyl-containing monomers including, for example, hydroxyalkyl(meth)acrylates such as hydroxyethyl(meth)acrylates, hydroxypropyl(meth)acrylates, and hydroxybutyl(meth)acrylates; amido-containing monomers such as acrylamide, methacrylamide, N,N-dimethyl(meth)acrylamides, N-methylol(meth)acrylamides, N-methoxymethyl(meth)acrylamides, and N-butoxymethyl(meth)acrylamides; amino-containing monomers such as aminoethyl(meth)acrylates, dimethylaminoethyl(meth)acrylates, and t-butylaminoethyl(meth)acrylates; glycidyl-containing monomers such as glycidyl(meth)acrylates and methylglycidyl(meth)acrylates; cyano-containing monomers such as acrylonitrile and methacrylonitrile; heterocycle-containing vinyl monomers such as N-vinyl-2-pyrrolidone, (meth)acryloylmorpholines, N-vinylpyridine, N-vinylpiperidone, N-vinylpyrimidine, N-vinylpiperazine, N-vinylpyrazine, N-vinylpyrrole, N-vinylimidazole, and N-vinyloxazole. Carboxyl-containing monomers such as acrylic acid, and anhydrides thereof are preferred as the polar-group-containing monomer.

The amount of one or more polar-group-containing monomers is, for example, 30 percent by weight or less, preferably 1 to 30 percent by weight, and more preferably 3 to 20 percent by weight, based on the total amount of monomer components for constituting the acrylic pressure-sensitive adhesive (acrylic polymer). If the amount of polar-group-containing monomers is more than 30 percent by weight, the acrylic pressure-sensitive adhesive may have excessively high cohesive strength and may have insufficient pressure-sensitive adhesiveness. If the amount of polar-group-containing monomers is excessively small, the acrylic pressure-sensitive adhesive may have insufficient cohesive strength and may be unlikely to be sufficiently resistant to shearing force.

Examples of the multifunctional monomer include hexanediol di(meth)acrylates, (poly)ethylene glycol di(meth)acrylates, (poly)propylene glycol di(meth)acrylates, neopentyl glycol di(meth)acrylates, pentaerythritol di(meth)acrylates, pentaerythritol tri(meth)acrylates, dipentaerythritol hexa(meth)acrylates, trimethylolpropane tri(meth)acrylates, tetramethylolmethane tri(meth)acrylates, allyl(meth)acrylates, vinyl(meth)acrylates, divinylbenzene, epoxy acrylate, polyester acrylates, urethane acrylates, butyl di(meth)acrylates, and hexyl di(meth)acrylates.

The amount of one or more multifunctional monomers is, for example, 2 percent by weight or less, preferably 0.01 to 2 percent by weight, and more preferably 0.02 to 1 percent by weight, based on the total amount of monomer components for preparation of the acrylic pressure-sensitive adhesive. If the amount of multifunctional monomers exceeds 2 percent by weight, the acrylic pressure-sensitive adhesive may have excessively high cohesive strength and may have insufficient pressure-sensitive adhesiveness (tacky adhesiveness). If the amount of multifunctional monomers is excessively small, the acrylic pressure-sensitive adhesive may have insufficient cohesive strength.

Other copolymerizable monomers than polar-group-containing monomers and multifunctional monomers include, for example, vinyl esters such as vinyl acetate and vinyl propionate; aromatic vinyl compounds such as styrene and vinyltoluene; olefins and dienes such as ethylene, butadiene, isoprene, and isobutylene; vinyl ethers such as vinyl alkyl ethers; vinyl chloride; (meth)acrylic alkoxyalkyl monomers such as methoxyethyl(meth)acrylates and ethoxyethyl(meth)acrylates; sulfonic-containing monomers such as sodium vinylsulfonate; phosphorus-containing monomers such as 2-hydroxyethyl acryloyl phosphate; imido-containing monomers such as cyclohexyl maleimide and isopropyl maleimide; isocyanato-containing monomers such as 2-methacryloyloxyethyl isocyanate; fluorine-containing (meth)acrylates; and silicon-containing (meth)acrylates.

The content of the pressure-sensitive adhesive, such as an acrylic polymer, in the bubbles containing pressure-sensitive adhesive layer is preferably 50 percent by weight or more based on the total amount of the bubbles containing pressure-sensitive adhesive layer.

The bubbles in the bubbles containing pressure-sensitive adhesive layer are basically desirably bubbles independently not joined but may be a mixture of the bubbles independently not joined and continuously joined bubbles.

The bubbles may generally be spherical, particularly exactly spherical, but they may be irregularly spherical. The average bubble diameter is not particularly limited and may be set within the range of, for example, 1 to 1000 μm, preferably 10 to 500 μm, and further preferably 30 to 300 μm.

A gaseous component contained in the bubbles (hereinafter also referred to as "bubble-forming gas") is not particularly limited, and examples of such gaseous components include inert gases such as nitrogen, carbon dioxide, and argon gases; and air. When a reaction such as a polymerization reaction is carried out in the presence of a bubble-forming gas, the bubble-forming gas should be one that does not adversely affect the reaction. The bubble-forming gas for use herein is preferably nitrogen gas, because it is inert to reactions and is availably inexpensively.

The amount of bubbles in the bubbles containing pressure-sensitive adhesive layer is not particularly limited, can be set as appropriate according typically to purpose of use, and may be, for example, 10 percent by volume (volume in volume percent) or more, preferably 11 percent by volume or more, and further preferably 12 percent by volume or more, based on the total volume of the bubbles containing pressure-sensitive adhesive layer. The upper limit of the amount of bubbles in the bubbles containing pressure-sensitive adhesive layer is not particularly limited, and may be, for example, 50 percent by volume, preferably 40 percent by volume, and further preferably 30 percent by volume.

How bubbles are formed in a bubbles containing pressure-sensitive adhesive layer is not particularly limited. The bubbles containing pressure-sensitive adhesive layer may be any one such as a bubbles containing pressure-sensitive adhesive layer formed from a pressure-sensitive adhesive composition previously containing a bubble-forming gas; or a bubbles containing pressure-sensitive adhesive layer formed from a pressure-sensitive adhesive composition containing a foaming agent. The amount of bubbles in the bubbles containing pressure-sensitive adhesive composition can be set as appropriate according to the target amount of bubbles in the resulting bubbles containing pressure-sensitive adhesive layer.

The bubbles containing pressure-sensitive adhesive layer may further contain a surfactant as an aid for incorporating bubbles. Examples of surfactants for use herein include fluorine-containing surfactants, silicone surfactants, nonionic surfactants, and ionic surfactants. Among them, fluorine-containing surfactants are preferred, because they satisfactorily serve to incorporate bubbles into the layer and to prevent coalescence of the bubbles.

Of such fluorine-containing surfactants, fluorine-containing surfactants containing a fluorine-containing polymer with a weight-average molecular weight of 20000 or more are preferred. The fluorine-containing polymer may have a weight-average molecular weight of preferably 20000 to 100000, further preferably 22000 to 80000, and particularly preferably 24000 to 60000. If the weight-average molecular weight of a fluorine-containing polymer is less than 20000, bubbles may not be incorporated (admixed) sufficiently, the mixed bubbles may become less stable, and the amount of admixed bubbles may be insufficient. Even if admixed, the admixed bubbles are likely to coalesce after admixing and before the formation of a bubbles containing pressure-sensitive adhesive layer. This may result in a bubbles containing pressure-sensitive adhesive layer with an insufficient amount of bubbles or a bubbles containing pressure-sensitive adhesive layer with bubbles penetrating the layer to form through holes. Each of the fluorine-containing polymers can be used alone or in combination.

These fluorine-containing polymers contain, as a monomer component, at least a monomer having a fluorine-containing group (hereinafter also referred to as "fluorine-containing monomer"). Each of such fluorine-containing monomers can be used alone or in combination.

Specific examples of fluorine-containing surfactants include commercially available products under the trade names of "EFTOP EF-352" (supplied by JEMCO Inc.), "EFTOP EF-801" (supplied by JEMCO Inc.), "Unidyne TG-656" (supplied by Daikin Industries, Ltd.).

The amount (solid content) of fluorine-containing surfactants is not particularly limited but may be set within the ranges of, for example, 0.01 to 2 parts by weight, preferably 0.03 to 1.5 parts by weight, and further preferably 0.05 to 1 parts by weight, to 100 parts by weight of total monomer components for constituting a base polymer in a pressure-sensitive adhesive composition, particularly to 100 parts by weight of total monomer components for constituting an acrylic polymer containing a (meth)acrylic ester as a main monomer component. If the amount of fluorine-containing surfactants is less than 0.01 parts by weight, bubbles may be unlikely to be admixed in a sufficient amount into a bubbles containing pressure-sensitive adhesive composition. In contrast, if it exceeds 2 parts by weight, the bubbles containing pressure-sensitive adhesive layer may be unlikely to show sufficient adhesive performance.

When a bubbles containing pressure-sensitive adhesive layer is formed from a pressure-sensitive adhesive composition containing a foaming agent, the foaming agent is not particularly limited and can be selected as appropriate from among known foaming agents. The foaming agent can be, for example, thermally expandable microspheres.

Hollow microspheres for use in the bubbles containing pressure-sensitive adhesive layer include inorganic hollow microspheres and organic hollow microspheres. Specifically, examples of inorganic hollow microspheres include hollow balloons made of glass, such as hollow glass balloons; hollow balloons made of metallic compounds, such as hollow alumina balloons; hollow balloons made of porcelain, such as hollow ceramic balloons. Examples of organic hollow microspheres include hollow balloons made of resins, such as hollow acrylic balloons and hollow vinylidene chloride balloons. Surfaces of such hollow microspheres may undergo a surface treatment, such as a treatment for lowering surface tension with a silicone compound or a fluorine-containing compound.

The particle diameter (average particle diameter) of the hollow microspheres is not particularly limited and can be set within the range of, for example, 1 to 500 μm, preferably 5 to 200 μm, and further preferably 10 to 100 μm.

The specific gravity of the hollow microspheres is not particularly limited and can be set within the range of, for example, 0.1 to 0.8 $g/cm^3$, and preferably 0.12 to 0.5 $g/cm^3$. The hollow microspheres having a specific gravity less than 0.1 $g/cm^3$ may not be sufficiently mixed with and homogeneously dispersed in a pressure-sensitive adhesive for constituting the bubbles containing pressure-sensitive adhesive layer, because such hollow microspheres may float from the matrix adhesive upon admixing. In contrast, those having a specific gravity of more than 0.8 $g/cm^3$ may be excessively expensive and may add production costs.

The amount of the hollow microspheres is not particularly limited and can be set within the range of, for example, 10 to 50 percent by volume (volume in volume percent), and preferably 15 to 40 percent by volume, based on the total volume of the bubbles containing pressure-sensitive adhesive layer. Hollow microspheres, if used in an amount less than 10 percent by volume based on the total volume of the bubbles containing pressure-sensitive adhesive layer, may not function sufficiently effectively. In contrast, those in an amount exceeding 50 percent by volume may be likely to lower the adhesive strength of the bubbles containing pressure-sensitive adhesive layer.

When the bubbles containing pressure-sensitive adhesive layer is prepared by using a curing reaction by the action of heat or active energy rays, the pressure-sensitive adhesive composition preferably further contain a polymerization initiator such as a thermal initiator or a photoinitiator. By curing a pressure-sensitive adhesive composition including bubbles by the action of heat or energy rays, a bubbles containing pressure-sensitive adhesive layer having a structure which the bubbles are stably contained can be easily obtained. One or more photoinitiators are preferably used as the polymerization initiator, because polymerization can be conducted in a short time (duration). Each of these polymerization initiators can be used alone or in combination.

The photoinitiators include, but are not limited to, for example, benzoin ether photoinitiators, acetophenone photoinitiators, alpha-ketol photoinitiators, aromatic sulfonyl chloride photoinitiators, photoactivatable oxime photoinitiators, benzoin photoinitiators, benzyl photoinitiators, benzophenone photoinitiators, ketal photoinitiators, and thioxanthone photoinitiators.

The amount of photoinitiators is not particularly limited and can be set within the range of, for example, 0.01 to 5 parts by weight, and preferably 0.05 to 3 parts by weight, to 100 parts by weight of total monomer components for the preparation of the pressure-sensitive adhesive.

In the activation of photoinitiators, it is important to apply active energy rays to a pressure-sensitive adhesive composition. Examples of such active energy rays include ionizing radiations such as alpha rays, beta rays, gamma rays, neutron rays, and electron beams; and ultraviolet rays, of which ultraviolet rays are preferred. The energy, duration, and process of application of active energy rays are not particularly limited, as long as the photoinitiator(s) can be activated to induce a reaction of monomer components.

Examples of the thermal initiator include azo polymerization initiators, peroxide polymerization initiators, and redox polymerization initiators. The amount of such thermal initiators is not particularly limited, as long as they can function as thermal initiators.

The bubbles containing pressure-sensitive adhesive layer (or pressure-sensitive adhesive composition) may contain one or more additives suitable for the use of the pressure-sensitive adhesive sheet. Examples of such additives include crosslinking agents such as polyisocyanate crosslinking agents, silicone crosslinking agents, epoxy crosslinking agents, and alkyl-etherified melamine crosslinking agents; tackifiers including tackifiers that are solid, semi-solid, or liquid at ordinary temperature, composed typically of rosin derivative resins, polyterpene resins, petroleum resins, and oil-soluble phenolic resins; plasticizers; fillers; age resistors; antioxidants; and colorants such as pigments and dyestuffs.

Typically, when the bubbles containing pressure-sensitive adhesive layer is formed by using a photoinitiator, a pigment (coloring pigment) can be used to color the bubbles containing pressure-sensitive adhesive layer in which the amount of the pigment is within such a range not adversely affecting a photo-polymerization reaction. When the bubbles containing pressure-sensitive adhesive layer is desired to be colored black, carbon black can be used as a coloring pigment. It is desirable to set the amount of carbon black within the range of, for example, 0.15 part by weight or less, preferably 0.001 to 0.15 part by weight, and more preferably 0.02 to 0.1 part by weight, to 100 parts by weight of total monomer components for the preparation of a base polymer in a pressure-sensitive adhesive composition constituting a pressure-sensitive adhesive layer containing gas bubbles, particularly to 100 parts by weight of total monomer components for the preparation of an acrylic polymer containing a (meth)acrylic ester as a main monomer component. This range is set from the viewpoint of not adversely affecting the photo-polymerization reaction, while it may vary depending on the desired degree of coloring.

The bubbles containing pressure-sensitive adhesive layer may have any structure of a single layer structure and a multilayer structure. The thickness of the bubbles containing pressure-sensitive adhesive layer is not particularly limited and is preferably 0.2 to 2 mm. When the sheet is used for automotive emblems, the thickness of the layer is preferably 0.2 to 1.2 mm, and more preferably 0.4 to 1.2 mm. A bubbles containing pressure-sensitive adhesive layer having a thickness of less than 0.2 mm may have insufficient cushioning property and thereby may have insufficient adhesion to a curved surface or uneven surface. In contrast, a bubbles containing pressure-sensitive adhesive layer having a thickness more than 2 mm may be unlikely to have a uniform thickness.

The expansion ratio (foaming magnification) (%) of the bubbles containing pressure-sensitive adhesive layer is, for example, preferably 10% or more, more preferably 11% or more, and further preferably 12% or more. The upper limit of the expansion ratio is not particularly limited and is, for example, preferably 50% or less, more preferably 40% or less, and further preferably 30% or less. The expansion ratio of the bubbles containing pressure-sensitive adhesive layer can be determined according to the following equation:

$$\text{Expansion ratio (\%) of bubbles containing pressure-sensitive adhesive layer} = (1 - B/A) \times 100$$

wherein "A" represents the specific gravity of a pressure-sensitive adhesive layer, which is formed by curing a pressure-sensitive adhesive containing no bubbles (bubble-free pressure-sensitive adhesive layer); and "B" represents the specific gravity of a bubbles containing pressure-sensitive adhesive layer which is formed by curing a pressure-sensitive adhesive incorporated with bubbles, in which the pressure-sensitive adhesives relating to "A" and "B" have the same composition, except for the presence or absence of bubbles.

The pressure-sensitive adhesive composition for the preparation of the bubbles containing pressure-sensitive adhesive layer may be prepared by mixing monomer components for the preparation of the base polymer, such as an alkyl(meth)acrylate, and, where necessary, hollow microspheres, a polymerization initiator, various additives and the like, according to a known procedure. Part of monomer components may be polymerized in this process where necessary typically for viscosity control. Specifically, the pressure-sensitive adhesive composition may be prepared, for example, by the following procedure. (i) A monomer mixture is prepared by blending monomer components for the preparation of the base polymer, such as an alkyl(meth)acrylate and other copolymerizable monomers, and a polymerization initiator such as a photoinitiator. (ii) A polymerization reaction of the monomer mixture corresponding to the type of the polymerization initiator, such as ultraviolet polymerization reaction, is carried out to give a composition (syrup) in which only part of the monomer components has been polymerized. Subsequently, (iii) if necessary, the syrup is incorporated with hollow microspheres, fluorine-containing surfactants, and other additives to obtain a blend. In addition, to incorporate bubbles, (iv) the blend (compound) obtained in the step (iii) is further incorporated with and mixed with bubbles. Thus, a pressure-sensitive adhesive composition is prepared. However, the preparation procedure of the pressure-sensitive adhesive composition is not limited to this. For example, fluorine-containing surfactants and hollow microspheres may be previously incorporated into the monomer mixture before the preparation of the syrup.

When bubbles are incorporated to form a bubbles containing pressure-sensitive adhesive layer, it is desirable to incorporate the bubbles as a last component into a pressure-sensitive adhesive composition, as in the above-mentioned preparation procedure, for stably mixing and incorporating the bubbles to form the bubbles containing pressure-sensitive adhesive layer. A blend before incorporated with bubbles (e.g., the blend obtained in the step (iii)) preferably has a high viscosity so as to stably incorporate the bubbles thereinto. The viscosity of a blend before incorporated with bubbles is not particularly limited and is preferably, for example, 5 to 50 Pa·s, and more preferably 10 to 40 Pa·s, as measured with a BH type viscometer having a No. 5 rotor at a number of revolutions of 10 rpm and a measuring temperature of 30° C. If a blend has an excessively low viscosity of less than 5 Pa·s, the incorporated bubbles may immediately coalesce to escape out of the system. If a blend has an excessively high viscosity of more than 50 Pa·s, it may be difficult to form a bubbles containing pressure-sensitive adhesive layer by application (coating). The viscosity can be adjusted, for example, by compounding one or more polymer components such as acrylic rubber and tackifying (thickening) additives; or by polymerizing part of monomer components for the preparation of a base polymer.

In the preparation of the bubbles containing pressure-sensitive adhesive layer, a process for incorporating or mixing bubbles is not particularly limited and any known process for mixing bubbles can be employed. Typically, an apparatus used herein can be, for example, an apparatus equipped with a stator having a large number of fine teeth on a disk having a through hole in its center, and a rotor that is positioned on the disk in opposition to the stator and has a large number of fine teeth similar to the stator. By passing a blend into the gaps between the teeth on the stator and the teeth on the rotor, and a gaseous component (bubble-forming gas) from the through hole into the gaps between the teeth on the stator and the teeth on the rotor, with rotating the rotor at high speed, the bubble-forming gas is finely dispersed and mixed into the blend to yield a resin precursor composition (pressure-sensitive adhesive composition) including finely dispersed bubbles.

For suppressing or preventing coalescence of bubbles, it is desirable to continuously carry out a series of steps from the incorporating of bubbles to the formation of a bubbles containing pressure-sensitive adhesive layer.

The bubbles containing pressure-sensitive adhesive layer can be formed according to a known or common process, such as a process in which a pressure-sensitive adhesive composition is applied to the release liner to form a pressure-sensitive adhesive composition layer, and the layer is cured and/or dried, according to the necessity. The curing may be conducted, for example, by the action of heat or active energy rays. The layer is preferably cured by the application of active energy rays, as mentioned above. To prepare a pressure-sensitive adhesive sheet including a substrate (support), it is also acceptable that a pressure-sensitive adhesive composition is applied to the substrate, is cured to form a pressure-sensitive adhesive layer, and the release liner is affixed thereto.

When a pressure-sensitive adhesive sheet according to the present invention includes a substrate (support) in addition to the bubbles containing pressure-sensitive adhesive layer, the substrate can be any known or common substrate for use in pressure-sensitive adhesive sheets. Examples thereof include suitable thin materials including paper substrates such as papers; fibrous substrates such as fabrics, nonwoven fabrics, and nets; metallic substrates such as metallic foils and metallic sheets; plastic substrates such as plastic films and sheets; rubber substrates such as rubber sheets; foams such as foam sheets; and laminates of these. In particular, the substrate can be a laminate of a plastic substrate with another substrate, and a laminate of two or more plastic films or sheets are preferred. Materials for such plastic films and sheets include, for example, polyolefin resins containing an alpha olefin as a monomer component, such as polyethylenes (PE), polypropylenes (PP), ethylene-propylene copolymers, and ethylene-vinyl acetate copolymers (EVA); polyester resins such as poly(ethylene terephthalate) (PET), poly(ethylene naphthalate) (PEN), and poly(butylene terephthalate) (PBT); poly (vinyl chloride) (PVC); vinyl acetate resins; poly(phenylene sulfide) (PPS); amide resins such as polyamides (Nylons) and wholly aromatic polyamides (aramids); polyimide resins; and poly (ether ether ketone) (PEEK). Each of these materials can be used alone or in combination.

The foamed pressure-sensitive adhesive sheet can be a commercially available product such as the products supplied by Nitto Denko Co., Ltd. under the trade names of "HYPER-JOINT A3008, A4002, A4004, A4006, A4008, and A4012" (transfer pressure-sensitive adhesive double-sided sheets).

[Pressure-Sensitive Adhesive Sheet With a Release Liner]

Pressure-sensitive adhesive sheets with a release liner according to the present invention may have any of structures such as a structure including a pressure-sensitive adhesive sheet which has an adhesive surface only on one side thereof, and a release liner arranged on the adhesive surface; a structure including a pressure-sensitive adhesive double-sided sheet, and release liners arranged on both sides of the pressure-sensitive adhesive double-sided sheet respectively; and a structure including a pressure-sensitive adhesive double-sided sheet and a release liner arranged only on one side of the pressure-sensitive adhesive double-sided sheet, in which the sheet with the release liner is rolled or stacked so that the other surface (back surface or second surface) of the release liner is in contact with the other adhesive surface of the pressure-sensitive adhesive sheet on which no release liner is provided. Among these structures, a structure including a pressure-sensitive adhesive double-sided sheet and a release liner arranged only on one side of the pressure-sensitive adhesive double-sided sheet is preferred for effectively exhibiting advantages of the present invention.

The pressure-sensitive adhesive sheets with a release liner can be, for example, in sheet form or in tape form. They can also be in rolled form.

The pressure-sensitive adhesive sheets with a release liner are substantially free from lifting and unintended separation of the release liner even when stored in curved form, and can exhibit excellent releasability upon use. They also have good die-cutting workability and do not suffer from cutting failure and residual stock removal upon cutting and can thereby be suitably used for applications in which the sheets are die-cut into complicated shapes. More specifically, they are advantageously used typically as pressure-sensitive adhesive double-sided sheets (or tapes) for affixing automotive emblems.

Methods for Measuring Properties and Evaluating Advantages (1) Die-Cutting Workability Sample From each of pressure-sensitive adhesive sheets each having a release liner prepared according to following Examples and Comparative Examples, a silicone-treated polyester film was peeled off, and a one-side-treated release paper as a covering liner was laminated thereto to yield samples for use in die-cutting. The samples have a size of 10 mm wide by 40 mm long. The one-side-treated release paper was prepared by laminating Clupak paper having a basis weight of 73 g/m$^2$ with a polyethylene film, and carrying out treatment with a silicone.

Die-Cutting

Die-cutting was performed on a midpoint (10 mm by 20 mm) of a sample with a linear Thomson blade using a 10-ton pressing machine under the following conditions.

Die-Cutting Conditions:

Temperature and humidity: 23° C., 50% relative humidity

Pressing machine: 10-ton press

Pressing rate: 40 shots per minute

Blade type: Thomson blade (shape: two-edged, angle of blade: 42 degrees, entire cutting)

Skid: bakelite sheet (thickness: 2 mm)

Criteria

Die-cut products were observed and evaluated according to the following criteria:

Good die-cutting workability (Good): Sample can be cut satisfactorily even at 400 shots.

Poor die-cutting workability (Poor): Sample suffers from "whiskers" and/or partial "residual stock removal" at 200 shots or more and less than 400 shots.

Very poor die-cutting workability (Very poor): Sample suffers from "whiskers" and/or partial "residual stock removal" at less than 200 shots.

(2) Releasability

A strip test sample 25 mm wide by 150 mm long was prepared from each of the pressure-sensitive adhesive sheets each having a release liner prepared according to Examples and Comparative Examples. The sample has a longitudinal direction (lengthwise direction) in parallel with the machine direction (MD; flow direction) of a pressure-sensitive adhesive sheet.

After peeling off the silicone-treated polyester film from the sample sheet, the sample was affixed to a polyester film having a thickness of 50 μm ("Lumirror S-10" supplied by Toray Industries, Inc.). Next, the polyester film side was affixed to a rigid supporting sheet (stainless steel SUS 304BA sheet, 50 mm wide by 150 mm long).

Using a versatile tensile testing machine ("TG-1kNB" supplied by Minebea Co., Ltd.), a 180-degree peel test was conducted. The release liner side was pulled, the resistance (force required to peel the release liner) was measured, upper and lower 10% of the measured data were cut out, and the largest resistance was defined as the peeling strength.

The measurement was conducted in accordance with Japanese Industrial Standards (JIS) Z0237 in an atmosphere at a temperature of 23° C. and relative humidity of 50% at a tensile speed (crosshead speed) of 300 mm per minute. The test was conducted three times per sample and data were averaged.

The results were evaluated according to the following criteria:

Good releasability (Good): Peeling strength is less than 1.0 N/25 mm

Usable releasability (Fair): Peeling strength is 1.0 N/25 mm or more and less than 1.5 N/25 mm Poor releasability (Poor): Peeling strength is 1.5 N/25 mm or more.

(3) Releasability at the End

A strip test sample 25 mm wide by 300 mm long was prepared from each of the pressure-sensitive adhesive sheets each having a release liner prepared according to Examples and Comparative Examples. The sample has a longitudinal direction (lengthwise direction) in parallel with the machine direction (MD; flow direction) of a pressure-sensitive adhesive sheet. After peeling off the silicone-treated polyester film from the sample sheet, the sample was affixed to a polyester film having a thickness of 50 μm ("Lumirror S-10" supplied by Toray Industries, Inc.).

The polyester film and bubbles containing pressure-sensitive adhesive layer alone of the sample were cut (half-cut while remaining the release liner) at a point 150 mm long in a widthwise direction from the polyester film side with a trimming blade. Next, the polyester film side was affixed to a rigid supporting sheet (stainless steel SUS 304BA sheet, 50 mm wide by 150 mm long). Specifically, the pressure-sensitive adhesive layer and polyester film in a first half 150 mm long were removed, except for the release liner, and the second half 150 mm long was affixed to the stainless steel (SUS) sheet.

Using a versatile tensile testing machine ("TG-1kNB" supplied by Minebea Co., Ltd.), a 180-degree peel test was conducted. The release liner side was pulled, the resistance (force required to peel the release liner) was measured, and the maximum resistance of the measured data in the initial stages (at the beginning of peeling) was defined as the peeling strength at the end.

The measurement was conducted in accordance with JIS Z0237 in an atmosphere at a temperature of 23° C. and relative humidity of 50% at a tensile speed (crosshead speed) of 300 mm per minute. The test was conducted three times per sample and data were averaged.

The results were evaluated according to the following criteria:

Good releasability at the end (Good): Peeling strength at the end is less than 5.0 N/25 mm Usable releasability at the end (Fair): Peeling strength at the end is 5.0 N/25 mm or more and less than 10 N/25 mm Poor releasability at the end (Poor): Peeling strength at the end is 10 N/25 mm or more (4) Young's Modulus, Elongation at Break, and Breaking Strength A No. 3 dumbbell-shaped test sample was prepared by die-cutting each of the release liners prepared according to Examples and Comparative Examples. A test was conducted so that the measuring direction in equal to the machine direction (MD).

A tensile test was conducted using a versatile tensile testing machine ("TG-1kNB" supplied by Minebea Co., Ltd.) at an original length (measuring length) of 20 mm, a sample width of 5 mm, and a rate of pulling of 500 mm per minute, and the Young's modulus, elongation at break, and breaking strength were measured. The test was conducted three times per sample and data were averaged.

(5) Arithmetical Mean Surface Roughness (Ra)

The arithmetical mean surface roughness (Ra) of a sample was measured with a contact profilometer "P-15" supplied by KLA-Tencor Corporation in accordance with JIS B0601. The measuring was performed in a cross direction (transverse direction; TD). The test was conducted three times per sample and data were averaged.

EXAMPLES

The present invention will be illustrated in further detail with reference to several examples and comparative examples below. It should be noted, however, these are illustrated only by way of example and never construed to limit the scope of the present invention. In the following examples, comparative examples, and Table 1, one surface layer of a release liner to be affixed to a pressure-sensitive adhesive sheet is referred to as "first surface layer", and the other surface layer is referred to as "second surface layer (back surface)".

Example 1

Release Liner

First and second surface layers were prepared from a material mixture of 100 parts by weight of a linear low-density polyethylene ("MORETEC 0628D" supplied by Prime Polymer Co., Ltd., with a density of 916 kg/m$^3$) and 50 parts by weight of an ethylene-propylene copolymer elastomer ("TAFMER P0280" supplied by Mitsui Chemicals, Inc., with a density of 870 kg/m$^3$). An intermediate layer was prepared by using 100 parts by weight of a polypropylene ("Sumitomo Nobrene FS3611" supplied by Sumitomo Chemical Co., Ltd., with a density of 890 kg/m$^3$).

A release liner having a total thickness of 150 μm was prepared by three-layer coextrusion molding with a T-die and using a rubber textured roll and a metallic textured roll as a first surface layer side touch roll and a second surface layer side (back surface) touch roll, respectively. The release liner has a three-layer structure of (first surface layer)/(intermediate layer)/(second surface layer (back surface)) (thickness: 8 μm/134 μm/8 μm).

The first surface layer of the release liner had a surface roughness (arithmetical mean surface roughness; Ra) of 0.82 μm, and the second surface layer (back surface) had a surface roughness (Ra) of 1.35 μm.

Foamed Pressure-Sensitive Adhesive Sheet

A pressure-sensitive adhesive layer (bubbles containing pressure-sensitive adhesive layer) of "HYPERJOINT A4008" (supplied by Nitto Denko Co., Ltd.) was affixed to the first surface layer of the release liner.

Next, a silicone-treated polyester film was affixed to the other side of the bubbles containing pressure-sensitive adhesive layer opposite to the release liner and thereby yielded a pressure-sensitive adhesive sheet with a release liner.

Example 2

A pressure-sensitive adhesive sheet with a release liner was prepared by the procedure of Example 1, except for setting the total thickness of the release liner as shown in Table 1.

Examples 3 and 4

A pressure-sensitive adhesive sheet with a release liner was prepared by the procedure of Example 2, except for setting the thicknesses of the surface layers and the ratio in thickness of the intermediate layer to the surface layers, respectively, as shown in Table 1.

Example 5

A pressure-sensitive adhesive sheet with a release liner was prepared by the procedure of Example 4, except for using, as a resin for the intermediate layer, a high-density polyethylene ("HI-ZEX 3300F" supplied by Prime Polymer Co., Ltd.) instead of the polypropylene.

Comparative Example 1

A release liner was prepared by coextrusion inflation molding by setting parameters as shown in Table 1. Specifically, a low-density polyethylene resin ("NOVATEC LD UF641" supplied by Japan Polyethylene Corporation, with a density of 927 kg/m$^3$) was used alone as a resin for the first surface layer; a 60:40 (by weight) mixture of a high-density polyethylene ("HI-ZEX 3300F" supplied by Prime Polymer Co., Ltd., with a density of 950 kg/m$^3$) and a low-density polyethylene ("NOVATEC LD LF440HB" supplied by Japan Polyethylene Corporation, with a density of 925 kg/m$^3$) was used as resins for the intermediate layer and the second surface layer (back surface); and the thicknesses of the layers were set as in Table 1. Using this release liner, a pressure-sensitive adhesive sheet with a release liner was prepared by the procedure of Example 1.

Comparative Example 2

A pressure-sensitive adhesive sheet with a release liner was prepared by the procedure of Example 2, except for setting parameters or conditions such as the compositions of the surface layers, the type of resin for the intermediate layer, and thicknesses as shown in Table 1.

Comparative Example 3

A pressure-sensitive adhesive sheet with a release liner was prepared by the procedure of Example 2, except for setting parameters or conditions such as the resins for surface layers, and thicknesses as shown in Table 1.

Comparative Example 4

A pressure-sensitive adhesive sheet with a release liner was prepared by the procedure of Example 2, except for setting thicknesses as shown in Table 1 and using a metallic mirror roll as a touch roll for the second surface layer (back surface).

Comparative Examples 5 and 6

A pressure-sensitive adhesive sheet with a release liner was prepared by the procedure of Example 2, except for setting parameters or conditions such as the resins for surface layers and thicknesses as shown in Table 1.

The test results are shown in Table 1. Table 1 demonstrates that pressure-sensitive adhesive sheets with a release liner according to the present invention (Examples 1 to 5) excel in die-cutting workability and releasability.

In contrast, a pressure-sensitive adhesive sheet with a release liner whose surface layers do not contain a polyolefin elastomer (Comparative Example 1) is poor in releasability, although it has a relatively high strength and excels in die-cutting workability. Pressure-sensitive adhesive sheets with a release liner whose intermediate layer has a relatively small thickness with respect to surface layers (Comparative Examples 2 to 6) are poor in die-cutting workability.

TABLE 1

| | | | Ex. 1 | Ex. 2 | Ex. 3 | Ex. 4 | Ex. 5 | Com. Ex. 1 |
|---|---|---|---|---|---|---|---|---|
| Release liner | First surface layer | Polyolefin resin | LLDPE1 | LLDPE1 | LLDPE1 | LLDPE1 | LLDPE1 | LDPE1 |
| | | Elastomer | added | added | added | added | added | no |
| | | Compounding ratio (resin/elastomer) | 100/50 | 100/50 | 100/50 | 100/50 | 100/50 | 100/0 |
| | Intermediate layer | Resin | PP | PP | PP | PP | HDPE | HDPE/LDPE2 |
| | Second surface layer (back surface) | Polyolefin resin | LLDPE1 | LLDPE1 | LLDPE1 | LLDPE1 | LLDPE1 | HDPE/LDPE2 |
| | | Elastomer | added | added | added | added | added | no |
| | | Compounding ratio (resin/elastomer) | 100/50 | 100/50 | 100/50 | 100/50 | 100/50 | 100/0 |
| | Thickness (μm) | First surface layer | 8 | 7 | 12 | 7 | 7 | 21 |
| | | Intermediate layer | 134 | 116 | 102 | 111 | 110 | 64 |
| | | Second surface layer | 8 | 7 | 12 | 7 | 7 | 64 |
| | Total thickness (μm) | | 150 | 130 | 126 | 125 | 124 | 149 |
| | Thickness ratio (intermediate layer/total surface layers) | | 8.4 | 8.3 | 4.3 | 7.9 | 7.9 | 0.8 |
| | Properties | Young's modulus (MPa) | 248 | 220 | 241 | 262 | 338 | 246 |
| | | Elongation at break (%) | 1276 | 1232 | 1212 | 1105 | 1761 | 458 |
| | | Breaking strength (N/cm$^2$) | 3715 | 3943 | 4210 | 4161 | 4281 | 1606 |
| | Arithmetical mean surface roughness Ra (μm) | First surface layer | 0.82 | 0.88 | — | — | — | 0.10 |
| | | Second surface layer | 1.35 | 1.46 | — | — | — | 0.20 |
| Pressure-sensitive adhesive sheet | Pressure-sensitive adhesive | | acrylic | acrylic | acrylic | acrylic | acrylic | acrylic |
| | Bubble structure | | gas | gas | gas | gas | gas | gas |
| Result | Die-cutting workability | | Good | Good | Good | Good | Good | Good |
| | Releasability*1 (Peeling strength: N/25 mm) | | 0.75(0.48) | 0.76(0.46) | — | 1.00 | 1.31 | 1.75 |
| | Releasability at the end*2 (Peeling strength at the end: N/25 mm) | | 1.05(0.64) | 1.04(0.63) | — | 1.74 | 1.83 | 13.13 |

| | | | Com. Ex. 2 | Com. Ex. 3 | Com. Ex. 4 | Com. Ex. 5 | Com. Ex. 6 |
|---|---|---|---|---|---|---|---|
| Release liner | First surface layer | Polyolefin resin | LLDPE1 | LLDPE2 | LLDPE1 | LLDPE1 | LLDPE1 |
| | | Elastomer | added | added | added | added | added |
| | | Compounding ratio (resin/elastomer) | 100/75 | 100/50 | 100/50 | 100/50 | 100/50 |
| | Intermediate layer | Resin | HDPE | PP | PP | HDPE | HDPE |
| | Second surface layer (back surface) | Polyolefin resin | LLDPE1 | LLDPE2 | LLDPE1 | LLDPE1 | LLDPE1 |
| | | Elastomer | added | added | added | added | added |
| | | Compounding ratio (resin/elastomer) | 100/75 | 100/50 | 100/50 | 100/50 | 100/50 |
| | Thickness (μm) | First surface layer | 24 | 24 | 19 | 20 | 27 |
| | | Intermediate layer | 83 | 83 | 87 | 111 | 85 |
| | | Second surface layer | 24 | 24 | 17 | 12 | 19 |
| | Total thickness (μm) | | 131 | 131 | 123 | 143 | 131 |
| | Thickness ratio (intermediate layer/total surface layers) | | 1.7 | 1.7 | 2.4 | 3.5 | 1.8 |
| | Properties | Young's modulus (MPa) | 207 | 135 | 204 | 262 | 222 |
| | | Elongation at break (%) | 1543 | 1260 | 1152 | 1543 | 1542 |
| | | Breaking strength (N/cm$^2$) | 4329 | 4892 | 3535 | 3969 | 3904 |
| | Arithmetical mean surface roughness Ra (μm) | First surface layer | 1.39 | 1.09 | 1.79 | — | — |
| | | Second surface layer | 1.49 | 1.53 | 0.01 | — | — |
| Pressure-sensitive adhesive sheet | Pressure-sensitive adhesive | | acrylic | acrylic | acrylic | acrylic | acrylic |
| | Bubble structure | | gas | gas | gas | gas | gas |

TABLE 1-continued

| Result | Die-cutting workability | Poor | Very poor | Poor | Poor | Poor |
|---|---|---|---|---|---|---|
| | Releasability*1 (Peeling strength: N/25 mm) | 0.84 | 0.48 | 0.73(0.38) | — | 0.95 |
| | Releasability at the end*2 (Peeling strength at the end: N/25 mm) | 0.90 | 0.50 | 1.00(8.13) | — | 1.23 |

*1Parenthesized values are each peeling strength as determined when a similar pressure-adhesive layer is arranged on the second surface layer.
*2Parenthesized values are each peeling strength as determined when a similar pressure-adhesive layer is arranged on the second surface layer.
*The symbol "—" in arithmetical mean surface roughness and in results means that data are not measured.
Abbreviations in Table 1 are as follows:
LLDPE1: "MORETEC 0628D" supplied by Prime Polymer Co., Ltd., with a density of 916 kg/m$^3$
LLDPE2: "MORETEC 0218CN" supplied by Prime Polymer Co., Ltd., with a density of 910 kg/m$^3$
Elastomer: "TAFMER P0280" supplied by Mitsui Chemicals, Inc., with a density of 870 kg/m$^3$
PP: "Sumitomo Nobrene FS3611" supplied by Sumitomo Chemical Co., Ltd., with a density of 890 kg/m$^3$
HDPE: "HI-ZEX 3300F" supplied by Prime Polymer Co., Ltd., with a density of 950 kg/m$^3$
LDPE1: "NOVATEC LD UF641" supplied by Japan Polyethylene Corporation, with a density of 927 kg/m$^3$
LDPE2: "NOVATEC LD LF440HB" supplied by Japan Polyethylene Corporation, with a density of 925 kg/m$^3$ It should be understood by those skilled in the art that various modifications, combinations, subcombinations, and alterations may occur depending on design requirements and other factors insofar as they are within the scope of the appended claims or the equivalents thereof.

What is claimed is:

1. A release liner comprising at least three layers including an intermediate layer and surface layers, the surface layers positioned on both surfaces of the intermediate layer,
   wherein the intermediate layer comprises at least one polyolefin resin,
   each of the surface layers comprises a low-density polyethylene and an ethylene-alpha-olefin copolymer having a density of less than 900 (kg/m$^3$),
   each of the surface layers independently has a thickness of 15 μm or less, and
   the ratio of the thickness of the intermediate layer to the total thickness of the surface layers (the intermediate layer/the surface layers) is in the range of 4 to 19.

2. A pressure-sensitive adhesive sheet with a release liner, having a bubbles containing pressure-sensitive adhesive layer and a release liner, the release liner being in contact with at least one surface of the bubbles containing pressure-sensitive adhesive layer,
   wherein the release liner satisfies the following conditions (1) to (4):
   (1) the release liner comprises at least three layers including an intermediate layer and surface layers, the surface layers positioned on both surfaces of the intermediate layer;
   (2) the intermediate layer comprises at least one polyolefin resin;
   (3) each of the surface layers comprises a low-density polyethylene and an olefinic elastomer; and
   (4) each of the surface layers independently has a thickness of 15 μm or less, and the ratio of the thickness of the intermediate layer to the total thickness of the surface layers (the intermediate layer/the surface layers) is in the range of 4 to 19.

3. A pressure-sensitive adhesive sheet with a release liner, according to claim 2, wherein the olefinic elastomer comprises an ethylene-alpha-olefin copolymer having a density of less than 900 (kg/m$^3$).

4. A pressure-sensitive adhesive sheet with a release liner, according to claim 3, wherein the polyolefin resin comprises at least one of a polypropylene and a high-density polyethylene.

5. A pressure-sensitive adhesive sheet with a release liner, according to claim 4, wherein the bubbles containing pressure-sensitive adhesive layer comprises an acrylic pressure-sensitive adhesive.

6. A pressure-sensitive adhesive sheet with a release liner, according to claim 4, wherein the release liner has a thickness of 50 to 200 μm.

7. A pressure-sensitive adhesive sheet with a release liner, according to claim 3, wherein the bubbles containing pressure-sensitive adhesive layer comprises an acrylic pressure-sensitive adhesive.

8. A pressure-sensitive adhesive sheet with a release liner, according to claim 7, wherein the release liner has a thickness of 50 to 200 μm.

9. A pressure-sensitive adhesive sheet with a release liner, according to claim 3, wherein the release liner has a thickness of 50 to 200 μm.

10. A pressure-sensitive adhesive sheet with a release liner, according to claim 3,
    wherein the surface layers comprise a first surface layer and a second surface layer, the first surface layer being to be in contact with the bubbles containing pressure-sensitive adhesive layer, and the second surface layer being positioned on the opposite side of the first surface layer side, and
    wherein the bubbles containing pressure-sensitive adhesive layer has a thickness of 200 to 1200 μm,
    the first surface layer of the release liner has an arithmetical mean surface roughness (Ra) of 0.4 to 5.0 μm,
    the second surface layer of the release liner has an arithmetical mean surface roughness (Ra) of 0.4 to 5.0 μm, and
    the arithmetical mean surface roughness (Ra) of the second surface layer is larger than the arithmetical mean surface roughness (Ra) of the first surface layer.

11. A pressure-sensitive adhesive sheet with a release liner, according to claim 2, wherein the polyolefin resin comprises at least one of a polypropylene and a high-density polyethylene.

12. A pressure-sensitive adhesive sheet with a release liner, according to claim 11, wherein the bubbles containing pressure-sensitive adhesive layer comprises an acrylic pressure-sensitive adhesive.

13. A pressure-sensitive adhesive sheet with a release liner, according to claim 11, wherein the release liner has a thickness of 50 to 200 μm.

14. A pressure-sensitive adhesive sheet with a release liner, according to claim 11,
    wherein the surface layers comprise a first surface layer and a second surface layer, the first surface layer being to be in contact with the bubbles containing pressure-sensitive adhesive layer, and the second surface layer being positioned on the opposite side of the first surface layer side, and wherein the bubbles containing pressure-sensitive adhesive layer has a thickness of 200 to 1200 μm, the first surface layer of the release liner has an arithmetical mean surface roughness (Ra) of 0.4 to 5.0 μm, the second surface layer of the release liner has an arithmetical mean surface roughness (Ra) of 0.4 to 5.0 μm, and the arithmetical mean surface roughness (Ra) of the second surface layer is larger than the arithmetical mean surface roughness (Ra) of the first surface layer.

15. A pressure-sensitive adhesive sheet with a release liner, according to claim 2, wherein the bubbles containing pressure-sensitive adhesive layer comprises an acrylic pressure-sensitive adhesive.

16. A pressure-sensitive adhesive sheet with a release liner, according to claim 15, wherein the release liner has a thickness of 50 to 200 μm.

17. A pressure-sensitive adhesive sheet with a release liner, according to claim 15, wherein the surface layers comprise a first surface layer and a second surface layer, the first surface layer being to be in contact with the bubbles containing pressure-sensitive adhesive layer, and the second surface layer being positioned on the opposite side of the first surface layer side, and wherein the bubbles containing pressure-sensitive adhesive layer has a thickness of 200 to 1200 μm, the first surface layer of the release liner has an arithmetical mean surface roughness (Ra) of 0.4 to 5.0 μm, the second surface layer of the release liner has an arithmetical mean surface roughness (Ra) of 0.4 to 5.0 μm, and the arithmetical mean surface roughness (Ra) of the second surface layer is larger than the arithmetical mean surface roughness (Ra) of the first surface layer.

18. A pressure-sensitive adhesive sheet with a release liner, according to claim 2, wherein the release liner has a thickness of 50 to 200 μm.

19. A pressure-sensitive adhesive sheet with a release liner, according to claim 18, wherein the surface layers comprise a first surface layer and a second surface layer, the first surface layer being to be in contact with the bubbles containing pressure-sensitive adhesive layer, and the second surface layer being positioned on the opposite side of the first surface layer side, and wherein the bubbles containing pressure-sensitive adhesive layer has a thickness of 200 to 1200 μm, the first surface layer of the release liner has an arithmetical mean surface roughness (Ra) of 0.4 to 5.0 μm, the second surface layer of the release liner has an arithmetical mean surface roughness (Ra) of 0.4 to 5.0 μm, and the arithmetical mean surface roughness (Ra) of the second surface layer is larger than the arithmetical mean surface roughness (Ra) of the first surface layer.

20. A pressure-sensitive adhesive sheet with a release liner, according to claim 2, wherein the surface layers comprise a first surface layer and a second surface layer, the first surface layer being to be in contact with the bubbles containing pressure-sensitive adhesive layer, and the second surface layer being positioned on the opposite side of the first surface layer side, and wherein the bubbles containing pressure-sensitive adhesive layer has a thickness of 200 to 1200 μm, the first surface layer of the release liner has an arithmetical mean surface roughness (Ra) of 0.4 to 5.0 μm, the second surface layer of the release liner has an arithmetical mean surface roughness (Ra) of 0.4 to 5.0 μm, and the arithmetical mean surface roughness (Ra) of the second surface layer is larger than the arithmetical mean surface roughness (Ra) of the first surface layer.

* * * * *